US006823723B2

(12) United States Patent
Vandervorst et al.

(10) Patent No.: US 6,823,723 B2
(45) Date of Patent: Nov. 30, 2004

(54) METHOD AND APPARATUS FOR PERFORMING ATOMIC FORCE MICROSCOPY MEASUREMENTS

(75) Inventors: Wilfried Vandervorst, Mechelen (BE); Pierre Eyben, Luik (BE)

(73) Assignee: Interuniversitair Microelektronica Centrum (IMEC), Leuven (BE)

( * ) Notice: Subject to any disclaimer, the term of this patent is extended or adjusted under 35 U.S.C. 154(b) by 147 days.

(21) Appl. No.: 10/091,226

(22) Filed: Feb. 28, 2002

(65) Prior Publication Data

US 2002/0157457 A1 Oct. 31, 2002

Related U.S. Application Data

(60) Provisional application No. 60/272,249, filed on Feb. 28, 2001.

(51) Int. Cl.⁷ .................................................. G01B 5/28
(52) U.S. Cl. ............................................... 73/105
(58) Field of Search ............... 73/105; 324/754–769

(56) References Cited

U.S. PATENT DOCUMENTS

| | | | |
|---|---|---|---|
| 5,357,105 A | * | 10/1994 | Harp et al. ................. 250/234 |
| 5,412,980 A | | 5/1995 | Elings et al. |
| 5,585,734 A | | 12/1996 | Meuris et al. |
| 5,744,799 A | | 4/1998 | Ohara |
| 5,866,807 A | | 2/1999 | Elings et al. |
| 6,091,248 A | | 7/2000 | Hellemans et al. |
| 6,134,955 A | * | 10/2000 | Han et al. ..................... 73/105 |

FOREIGN PATENT DOCUMENTS

| | | |
|---|---|---|
| EP | 0 729 006 A2 | 8/1996 |
| WO | WO 99/45361 | 9/1999 |

OTHER PUBLICATIONS

Olbrich, et al., *Nanoscale Electrical Characterization of Thin Oxides with Conducting Atomic Force Microscopy*, 1998, proceedings of the 36ᵗʰ Annual International Reliability Physics Symposium, Reno, Nevada, pp. 163–168.

H. Edwards, et al., *pn–junction delineation in Si devices using scanning capacitance spectroscopy*, Feb. 1, 2000, Journal of Applied Physics, vol. 87, No. 3.

\* cited by examiner

*Primary Examiner*—Robert Raevis
(74) *Attorney, Agent, or Firm*—Knobbe Martens Olson & Bear LLP

(57) ABSTRACT

The present invention is related to a method and apparatus for performing Atomic Force Microscopy. In the method of the invention, a force profile is defined, and a sample is scanned by the AFM probe in such a way that the force between the sample and the probe is changed according to said predefined profile. The invention is equally related to an apparatus with which to perform said method.

22 Claims, 4 Drawing Sheets

METHOD AND APPARATUS FOR PERFORMING ATOMIC FORCE MICROSCOPY MEASUREMENTS

RELATED APPLICATIONS

This application claims priority under 35 U.S.C. § 119(e) from U.S. Provisional Application No. 60/272,249, filed Feb. 28, 2001, which is hereby incorporated by reference.

BACKGROUND OF THE INVENTION

1. Field of the Invention

The present invention is related to atomic force microscopy, which is a known technique for analysing the topography as well as the electrical characteristics of a sample, in particular a semiconductor device.

2. Description of the Related Technology

Atomic Force Microscopy (AFM) is recognised as an efficient technique for analysing very small semiconductor structures. AFM uses a probe, consisting of a very fine probe tip, which is mounted on a cantilever. The probe tip can be metal coated silicon, diamond coated silicon, full metal or full diamond. Diamond coated or diamond tips are used for analysing hard materials, such as silicon or SiO2. Silicon or metal tips are used for soft materials, such as InP, GaAs, or other III-V materials. During the measurement, the probe tip exerts a force on the sample, as it moves in a straight line over the sample under investigation. The movement is preferably performed by the tip with respect to a stationary sample. Subsequent scans of adjacent lines are performed in order to obtain a 2-dimensional analysis with a very high resolution, in the order of 10 to 30 nm in lateral direction. The movement of the probe tip in the direction perpendicular to the sample surface is detected, yielding an image of the sample's topography.

In the case of a sample consisting of a semiconducting or conducting material, electrical characteristics, such as local resistivity and capacitance can be measured, which are used for example to calculate the doping level distribution in a semiconductor sample. These electrical AFM measurements are performed with the help of a polarisation voltage between the probe and a back contact of the sample, and a measurement of a resulting electrical value, for example a current, a voltage or a capacitance, provided that the tip is sufficiently conducting. Some of the documented techniques in this respect are:

'Scanning Capacitance Microscopy (SCM)', and 'Scanning Capacitance Spectroscopy (SCS)', illustrated in the document 'pn-junction delineation in Si devices using scanning capacitance spectroscopy', H. Edwards et al, Journal of Applied Physics, vol. 87, no. 3, Feb. 1, 2000.

Tunnelling AFM (TUNA) and conductive AFM (C-AFM). These are techniques using current sensing for the electrical characterization of conductivity variations in highly-to-medium resistive samples. The use of AFM for measuring tunnelling currents is illustrated in the document "Nanoscale electrical characterization of thin oxides with conducting atomic force microscopy", A. Olbrich et al, proceedings of the 36th Annual International Reliability Physics Symposium, Reno, Nev., 1998, p. 163–168.

'Scanning Spreading Resistance Microscopy (SSRM)', described in document U.S. Pat. No. 5,585,734, and related technique 'Scanning Spreading Resistance Spectroscopy'. These techniques measure the resistance or conductivity of a semiconductor sample placed between the probe tip and a back contact, and derive from this the carrier profile of the semiconductor sample.

Nanopotentiometry, described in document U.S. Pat. No. 6,091,248. This technique measures an electrical potential in a semiconductor element with the help of an AFM microscope when applying/biasing one or more voltages over the semiconductor element.

Some of these techniques, in particular SSRM used on Si, require a high force between the probe tip and the sample, in order to obtain a good electrical contact. This high contact force quickly causes damage to the probe tip during scanning. To be more precise, the damage is mainly due to the lateral force (scratching), occurring while scanning in contact mode for high forces. This may lead to cleavage of sharp tips, or to a rapid increase of the tip radius of soft tips, the latter affecting the accuracy of the electrical measurements, as the contact radius is a determining parameter in the quantification. The larger the contact area between the probe tip and the surface under test, the smaller the resolution.

Other electrical measurements such as SCM and TUNA require smaller forces on the probe. The same is true for a good topography measurement. This dependency on the force level is the main problem when it comes to combining several measurements in one scan.

It has been shown that full metallic tips that are now available can be used to realize good electrical contact on silicon when remaining static, i.e. in point contact under a high contact force, whereas in scanning mode, the metal probe tip degrades almost immediately. One can release the probe tip and move to another point to avoid scratching of the sample, but no information will be obtained about the points lying in between the two measurement points. Because the full metallic and metallic coated Si-tips are unable to withstand high lateral forces, diamond coated Si-tips and full diamond tips have been introduced. Limitations of all diamond-containing tips are their price in terms of material as well as production cost, and the fact that diamond can only be doped to a limited concentration level of 3 ppm. Therefore, the resistance of the diamond probe remains relatively high (1 to 10 k$\Omega$) and it is not possible to measure highly doped areas (above $10^{20}$ atm/cm$^3$). One approach, wherein the force between the probe and the sample varies is the so called tapping mode technique, see document U.S. Pat. No. 5,412,980. In this technique, the probe is oscillated in a direction perpendicular to the sample at a frequency close to its resonant frequency, touching the sample only periodically. This technique is useful for a topography measurement, but is unsuitable for the measurement of electrical properties.

SUMMARY OF CERTAIN INVENTIVE ASPECTS

One aspect of the present invention provides a method and apparatus which allow the gathering of electrical data of various kinds while simultaneously measuring the topography of the sample. Another aspect of the invention is that such a method and apparatus should maximize the life of the probe tip and reduce the cost of operation.

Another aspect of the present invention provides a method for performing an atomic force microscopy (AFM) measurement, using an AFM microscope equipped with a probe, the method comprising: defining a force profile, which is a force change as a function of time, wherein the minimum force is larger than zero; and performing the AFM measurement on a sample, by scanning at least one line over the sample, wherein a force being exerted on the sample by the AFM probe is changed according to the force profile, during the movement of the probe in one direction along the line.

In another aspect of the invention, the method may further comprise defining a speed profile, which is a speed change of the probe as a function of time, and wherein the speed of said probe during the movement along said line changes according to said speed profile. In the method, said force profile is a periodic block wave, each cycle of said block wave consisting of an interval wherein said force is constant at a first level, followed by an interval wherein said force is constant at a second level, and wherein said first level is higher than said second level. In the method, said speed profile may equally be a periodic block wave, wherein said speed is constant during the intervals of said second force level, and wherein said speed is zero during the intervals of said first force level. Alternatively, said speed profile may be constant. In the method, electrical data as well as topographical data are gathered during one movement of said probe along one line. When the force profile is a block wave, at least one electrical measurement is performed during said first interval and wherein at least one topographical measurement is performed during said second interval.

Yet another aspect of the invention provides an apparatus for performing an atomic force microscopy measurement, comprising: an Atomic Force Microscope (AFM); an amplifier; an input/output device; and a controller device; wherein the input/output device is configured to receive at least one of a force profile and a speed profile, and to transfer the at least one of the profiles to the controller device, and wherein the controller device is configured to transmit the at least one of the profiles to the AFM, and wherein the apparatus is configured to perform a multiplexing/demultiplexing operation on the measurement data coming from the AFM, and wherein the amplifier amplifies the measured signals before performing the multiplexing/demultiplexing operation and transmits the measured signals to the controller device.

Still another aspect of the invention provides an apparatus for performing an atomic force microscopy measurement, comprising: an atomic force microscope (AFM) having a probe with a tip, the AFM configured to perform an atomic force microscopy measurement on a sample; and a controller configured to receive a force profile which is a force change as a function of time, and to control the AFM such that a force being exerted on the sample by the probe tip is changed based on the force profile during scan of at least one line on the sample.

Still another aspect of the invention provides a method of performing an atomic force microscopy measurement, comprising: Providing an atomic force microscope (AFM) including a probe with a tip; defining a force profile, which is a force change as a function of time; scanning at least one straight line over a sample using the prove tip; and changing a force being exerted on the sample by the probe tip based on the force profile during the scanning.

DESCRIPTION OF CERTAIN INVENTIVE EMBODIMENTS

In certain embodiments, the method of the invention is characterized by the fact that a modulated force is applied to the probe tip in an Atomic Force Microscopy analysis. Essentially, this means that the tip remains in contact during the complete scan of one straight line, while the force is changed in a predefined way during the scan. The force profile as a function of time may have any form imaginable, for example a block wave, a sine, a chain of pulses, a triangular or saw-like wave, or other. It may be periodical, or non-periodical. Because during the force cycle, the probe tip is always in contact with the sample under investigation, the minimum force is larger than zero. During the scan, the speed of the probe may be constant, or it may change according to a pre-defined speed profile, as a function of time.

According to an embodiment of the method, several measurements are performed during one scan, at given force levels. For example, a force cycle may be applied and repeated a number of times during one scan line. An electrical measurement requiring a high force level, such as SSRM, may be performed at one or more instants when the force is high, while the topography may be measured at one or more instants when the force is lower, all of this taking place within one cycle, and repeated during every consecutive cycle. The method further allows several electrical measurements, such as SSRM, SSRS and Nanopotentiometry, to take place within one force peak, or other electrical measurements such as Tunnelling AFM (TUNA) or SCM to take place during the low force interval, along with the topography measurement. An adequate form of multiplexing is necessary to obtain such multiple acquisitions.

The preferred force profile is a pulse train 1 with two force levels F1 and F2 (FIG. 1a), the lower level F2 being higher than zero, combined with a speed profile 2 which has the inverse shape of the force level profile, and wherein the minimum speed is zero. This means that the probe stops during a predefined time span while the high force is applied, whereas the probe only moves, preferably at a constant speed v1, while the low force is applied. A theoretical pair of curves is shown in FIG. 1a: in reality a finite transition time should be taken into account between zero speed and linear speed for the probe, and between high force and low force.

Figure 1A:
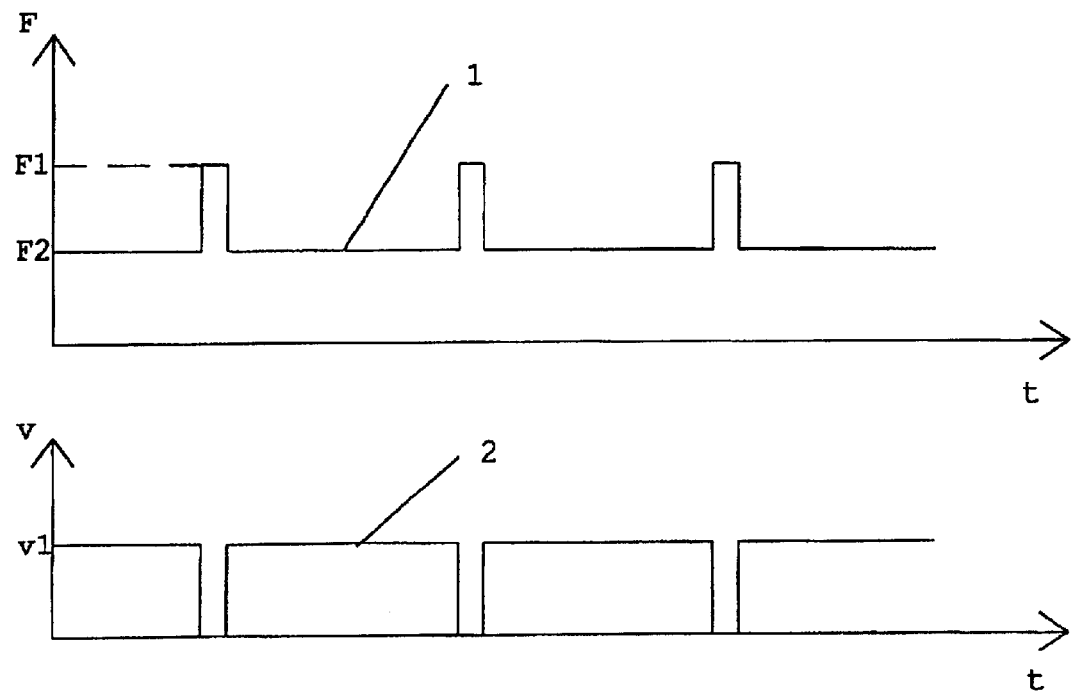
FIGS. 1a and 1b represent two examples of force and probe speed profiles, used one method embodiment of the invention.
Figure 1B:
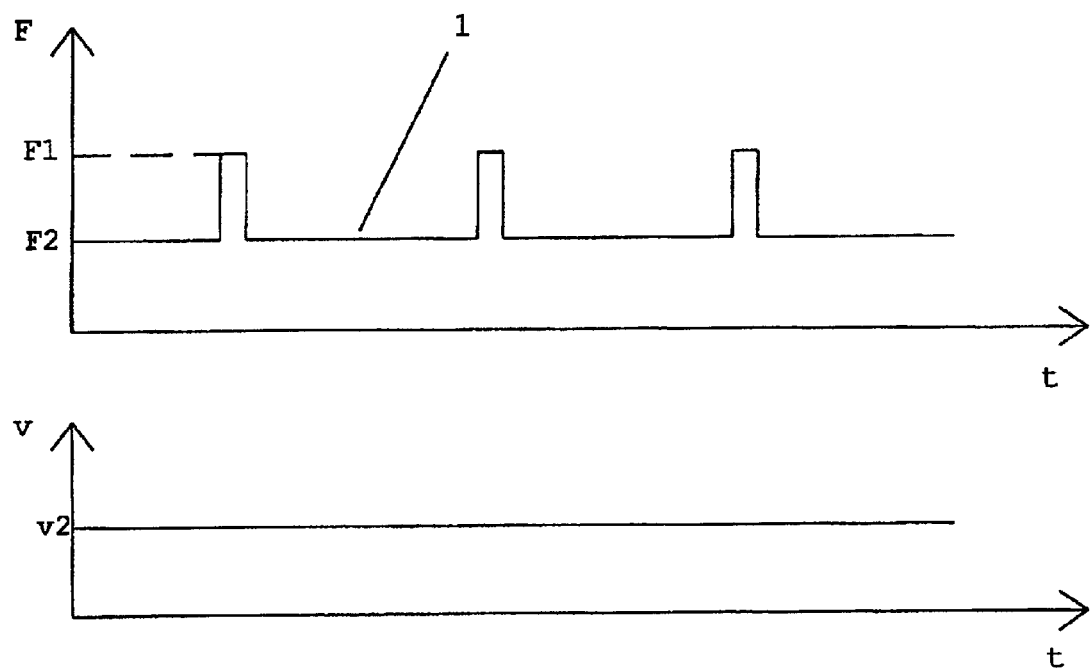

In another embodiment of the method of the invention, the force profile is identical to the one shown in FIG. 1a, but the probe moves at a constant speed v2 during the complete scan along a straight line, and the force is applied according to the predefined profile during this movement (FIG. 1b). This means that the probe moves during the periods when the force is high, but the force peaks are preferably chosen sufficiently short so that these periods of 'scratching' under a high contact force, are limited in length. A preferred cycle may comprise a high force peak of 1/10 of the cycle period, and a low force interval of 9/10 of said period (i.e. duty cycle 10%), while other combinations are of course not excluded from the scope of the present invention.

The method of the invention may allow the acquisition of electrical and topographical data in one scan, without exerting a constant high force on the probe. In fact, the intervals of high force can be limited to very short periods of time, so that damage caused by lateral forces on the probe tip are minimised.

Figure 2:
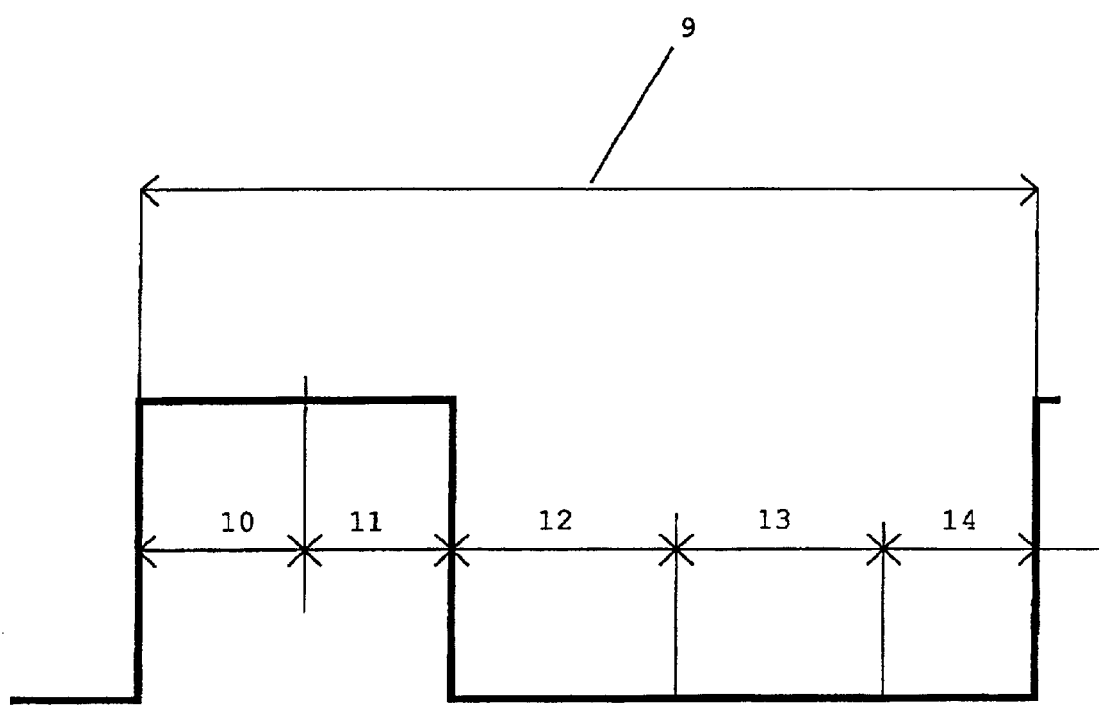
FIG. 2 represents a force cycle and its subdivisions according to an embodiment the invention.

Depending on the number of measurements performed during one cycle, and on the shape of the cycle, parameters may need to be set or calculated which define the actual moment when a measurement is to be taken. The example of a block wave is maintained in FIG. 2. One period 9 of the block wave is depicted, as well as a number of sub-intervals, which are described hereafter:

Interval 10: the time necessary for a stable electrical value, for example a current, to establish itself, after a transition from a low force to a high force.

Interval 11: the time during which one or more electrical measurements can be performed, for example a resistance measurement according to SSRM.

Interval 12: the time necessary before a stable topography measurement can be performed at the low force level. This time is mainly due to a short oscillation of the probe taking place after the transition from a high to a low contact force.

Interval 13: the time during which a stable topography measurement, or possibly one or more additional electrical measurements may be performed.

Interval 14: the time necessary for the acquisition equipment to ready itself for a new high pulse. The acquisition device will preferably use the rising force flank as a trigger pulse for starting the measurement. A minimum time might have to be incorporated to perform certain actions such as the emptying of temporary datastoring-means or buffers, before the next pulse can be detected.

The length of these intervals, as well as the exact sequence is dependent on a number of parameters, such as the exact force profile as well as on the characteristics of the hard- and software used to control an apparatus embodiment of the invention, as will be described hereafter.

Figure 3:
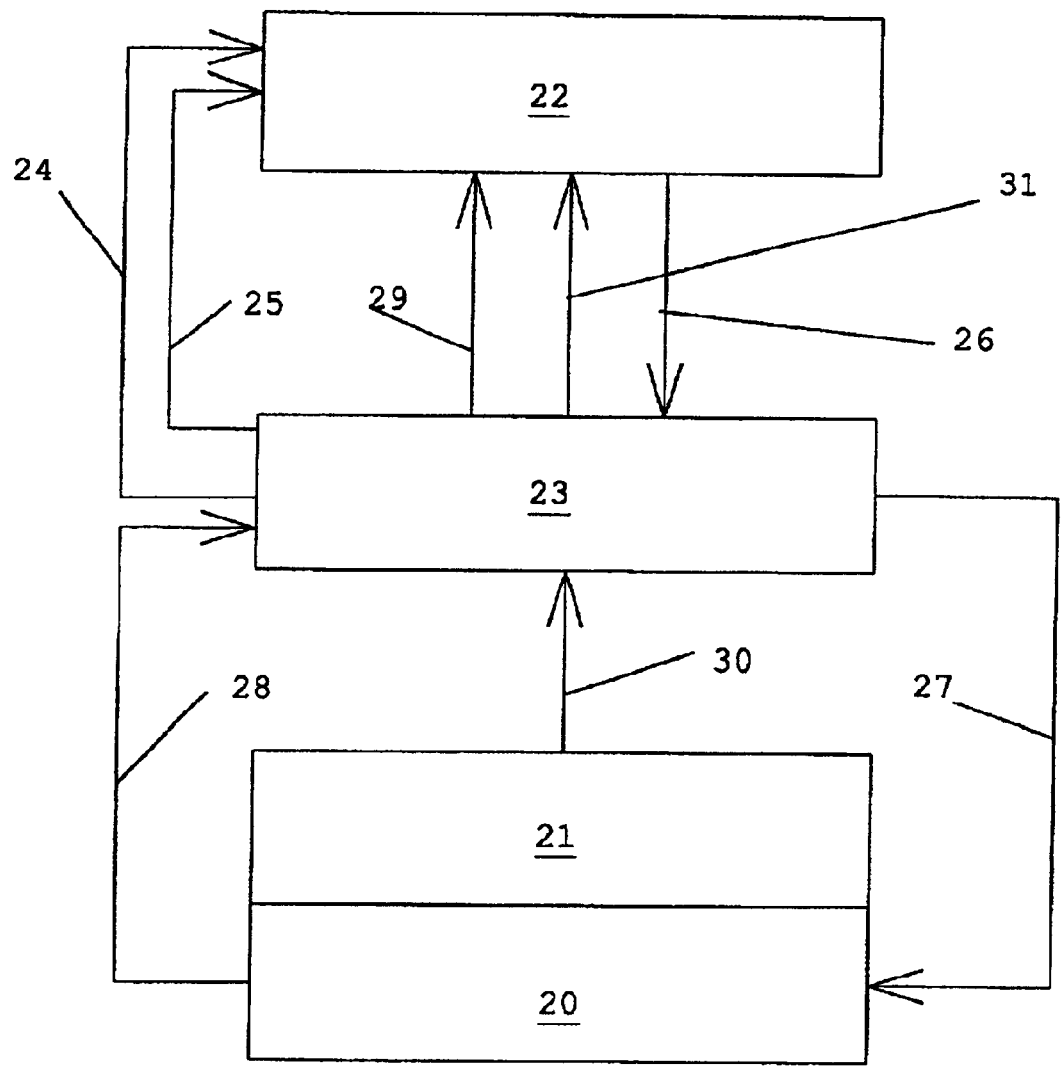
FIG. 3 schematically represents the building blocks of an apparatus according to one embodiment of the present invention.

As schematically shown in FIG. 3, an apparatus embodiment according to the invention comprises elements for performing the above method, namely:

an Atomic Force Microscope 20, an amplifier 21, preferably a logarithmic amplifier, a input/output device 22, e.g., a PC equipped with a graphical user interface, which allows parameters to be set, such as the force profile and maximum/minimum force level, the delay time after the start or end of a force pulse and before starting a data acquisition, the sample size, scan speed, etc. The device 22 also permits representation of the results of the various measurements, such as a 1-or 2-dimensional topography and/or resistance plot of the sample under test, a controller device 23, to communicate command signals to the AFM, based on the data entered in input device 22, thereby making the AFM work in a predefined regime in terms of scan line dimensions, speed, force levels, etc. This device may comprise a waveform generator, for providing the desired force profile.

The amplifier amplifies the measured signals before performing the multiplexing/demultiplexing operation and transmitting the measured signals to the controller device.

The signals shown can be described as follows:

The controller 23 sends an image pulse 24 and line pulse 25 to the input/output device 22, communicating the fact that the probe is ready to start scanning the sample (image pulse 24) and/or a new scanning line (line pulse 25).

Signals 26 and 27 represent the force profile, as it is transmitted from the PC 22 to the controller and from the controller to the AFM respectively. Signal 28 represents a topography related signal, coming from the AFM and directed to the controller, which process this signal (Analog Digital Conversion, amplifying etc.) and sends it on to the PC (signal 29). Signals 30 and 31 represent an electrical measurement, for example a resistance value, as it is transferred through the amplifier 21 to the controller 23 and from the controller 23 to the PC 22 respectively.

Many of the building blocks are similar to the existing AFM equipment. The input/output device and the controller of such existing AFM equipment are adapted so that they can produce a modulated force according to a predefined profile. Multiplexing is applied in order to obtain several measurements during one scan, in particular during one force cycle.

Figure 4:
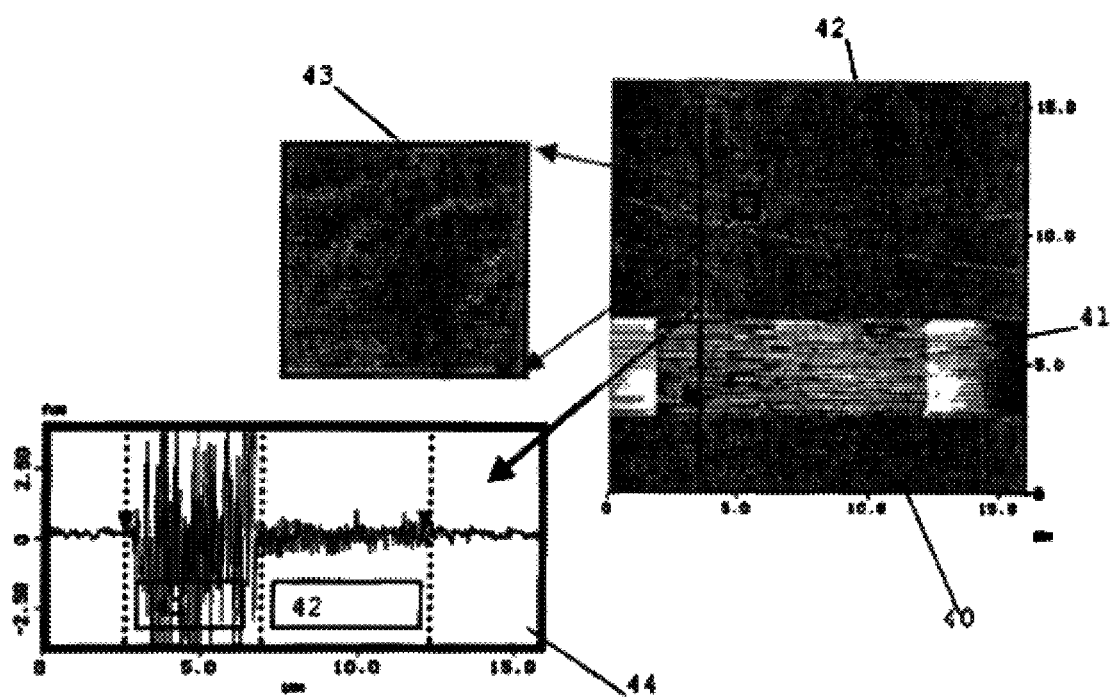
FIG. 4 illustrates the advantages of a method embodiment of the invention, over the prior art.

FIG. 4 illustrates the advantages of the method of the invention. Image 40 shows a top view of a semiconductor sample, which was partially analysed with the known technique for performing SSRM, i.e. using a constant high contact force (zone 41), and partially by using the method of the invention (zone 42). In zone 42, a pulsed force was applied with a profile similar to the one shown in FIG. 1a, and with a constant speed during the scan of a straight line (FIG. 1b). The displacement at low force level was rather large, hence the separate imprints of the probe tip, as can be seen in the detailed view 43.

The graph 44 compares the topography of the zones 41 and 42 after the measurement. It can be seen that in zone 42, the damage to the surface is very much reduced compared to the zone 41. This is a consequence of the fact that the movement under high lateral forces is reduced to a minimum, when the method of the invention is applied.

What is claimed is:

1. A method of performing an atomic force microscopy (AFM) measurement, using an AFM microscope equipped with a probe, the method comprising:

defining a force profile, which is a force change as a function of time, wherein the minimum force is larger than zero; and performing the AFM measurement on a sample, by scanning at least one line over the sample, wherein a force being exerted on the sample by the AFM probe is changed according to the force profile, during the movement of the probe in one direction along the line.

2. The method according to claim 1, further comprising defining a speed profile, which is a speed change of the probe as a function of time, and wherein a speed of the probe during the movement along the line changes according to the speed profile.

3. The method according to claim 2, wherein the force profile comprises a periodic block wave, each cycle of the block wave consisting of an interval wherein the force is constant at a first level, followed by an interval wherein the force is constant at a second level, and wherein the first level is higher than the second level.

4. The method according to claim 3, wherein the speed profile comprises a periodic block wave, wherein the speed has a first finite and constant value during the interval of the second level, and wherein the speed is zero during the interval of the first level.

5. The method according to claim 4, wherein the speed profile has a second constant and finite value.

6. The method according to claim 3, wherein at least one electrical measurement is performed during the interval of the first level, and wherein at least one topographical measurement is performed during the interval of the second level.

7. The method according to claim 1, wherein electrical data as well as topographical data are gathered during one movement of the probe along one line.

8. An apparatus for performing an atomic force microscopy measurement, comprising:

an atomic force microscope (AFM) having a probe with a tip, the AFM configured to perform an atomic force microscopy measurement on a sample; and a controller configured to receive a force profile which is a force change as a function of time, and to control the AFM such that a force being exerted on the sample by the probe tip is changed based on the force profile during scan of at least one line on the sample.

9. The apparatus of claim 8, wherein the force profile comprises a periodic block wave, each cycle of the block wave consisting of an interval wherein the force is constant at a first level, followed by an interval wherein the force is constant at a second level, and wherein the first level is higher than the second level.

10. The apparatus of claim 9, wherein the controller is configured to receive a speed profile which is a speed change as a function of time, and to control the AFM such that a movement speed of the probe is changed based on the speed profile during scan of at least one straight line on the sample.

11. The apparatus of claim 10, wherein the speed profile comprises a periodic block wave, wherein the speed has a first finite and constant value during the interval of the second level, and wherein the speed is zero during the interval of the first level.

12. The apparatus of claim 11, therein the speed profile has a second constant and finite value.

13. The apparatus of claim 8, further comprising an amplifier and an input/output device; and wherein the apparatus is configured to perform a multiplexing/demultiplexing operation on measurement signals coming from the AFM, and wherein the amplifier amplifies the measured signals and transmits the measured signals to the controller.

14. The apparatus of claim 8, wherein the minimum value of the force being exerted on the sample by the probe tip is larger than zero.

15. A method of performing an atomic force microscopy measurement, comprising:

providing an atomic force microscope (AFM) including a probe with a tip;

defining a force profile, which is a force change as a function of time;

scanning at least one line over a sample using the probe tip; and changing a force being exerted on the sample by the probe tip based on the force profile during the scanning.

16. The method of claim 15, wherein the force profile comprises a periodic block wave, each cycle of the block wave consisting of an interval wherein the force is constant at a first level, followed by an interval wherein the force is constant at a second level, and wherein the first level is higher than the second level.

17. The method of claim 16, further comprising defining a speed profile, which is a speed change of the probe as a function of time and changing a movement speed of the probe based on the speed profile.

18. The method of claim 17, wherein the speed profile comprises a periodic block wave, wherein the speed has a first finite and constant value during the interval of the second level, and wherein the speed is zero during the interval of the first level.

19. The method of claim 18, wherein the speed profile has a second constant and finite value.

20. The method of claim 15, wherein the minimum value of the force being exerted on the sample by the probe tip is larger than zero.

21. An apparatus for performing an atomic force microscopy (AFM) measurement, using an AFM microscope equipped with a probe, the apparatus comprising:

means for defining a force profile, which is a force change as a function of time, wherein the minimum force is larger than zero; and means for performing the AFM measurement on a sample, by scanning at least one line over the sample, wherein a force being exerted on the sample by the AFM probe is changed according to the force profile, during the movement of the probe in one direction along the line.

22. An apparatus for performing an atomic force microscopy measurement, comprising:

means for providing an atomic force microscope (AFM) including a probe with a tip;

means for defining a force profile, which is a force change as a function of time;

means for scanning at least one line over a sample using the probe tip; and means for changing a force being exerted on the sample by the probe tip based on the force profile during the scanning.

* * * * *

UNITED STATES PATENT AND TRADEMARK OFFICE
CERTIFICATE OF CORRECTION

PATENT NO. : 6,823,723 B2
APPLICATION NO. : 10/091226
DATED : November 30, 2004
INVENTOR(S) : Wilfrie Vandervorst and Pierre Eyben It is certified that error appears in the above-identified patent and that said Letters Patent is hereby corrected as shown below:

Column 7, Line 27, In Claim 12, delete "therein" and insert --wherein--, therefor.

Signed and Sealed this

Twenty-first Day of November, 2006

JON W. DUDAS
*Director of the United States Patent and Trademark Office*